United States Patent [19]

McElhenny

[11] Patent Number: 4,568,996
[45] Date of Patent: Feb. 4, 1986

[54] PROTECTIVE CIRCUIT FOR A SEPARATELY EXCITED D-C MOTOR
[75] Inventor: Stuart W. McElhenny, Erie, Pa.
[73] Assignee: General Electric Company, Erie, Pa.
[21] Appl. No.: 540,226
[22] Filed: Oct. 11, 1983
[51] Int. Cl.[4] .............................................. H02H 7/08
[52] U.S. Cl. ....................................... 361/31; 318/87; 361/87
[58] Field of Search .............. 361/28, 31, 87; 318/87, 318/376, 86, 88, 89, 375

[56] References Cited
U.S. PATENT DOCUMENTS
3,435,289 3/1969 Aselman, Jr. .
3,558,978 4/1970 Nye, Jr. et al. .
3,612,950 10/1971 Knott .
4,103,211 7/1978 Gardner et al. ...................... 318/87

Primary Examiner—Harry E. Moose, Jr.
Attorney, Agent, or Firm—Albert S. Richardson, Jr.

[57] ABSTRACT

The magnitudes of currents in the armature and field windings of a separately excited d-c motor are compared, and a fault signal is produced in response to the field current magnitude either rising above a first reference level (which varies as a first predetermined function of the armature current magnitude) or falling below a second reference level (which varies as another predetermined function of the latter magnitude).

14 Claims, 3 Drawing Figures

PROTECTIVE CIRCUIT FOR A SEPARATELY EXCITED D-C MOTOR

BACKGROUND OF THE INVENTION

The present invention relates generally to separately excited direct current (d-c) electric motors, and it relates more particularly to means for detecting a malfunction of the controls for such a motor.

In controlling an adjustable speed, separately excited d-c motor, it is common practice to increase or to decrease the magnitude of field current so that it varies with the magnitude of current in the armature of the motor according to a predetermined normal relationship. In the abnormal event of a malfunction or a fault in the control system, one or both of these currents can deviate appreciably from normal. If the faulty condition continues undetected for an extended period of time, the motor can suffer grave damage.

Persons skilled in the motor protection art are familiar with circuits and apparatus that disconnect or deenergize the motor upon detecting an overcurrent and/or overheated condition. Typically, such protective circuits respond to short circuits substantially instantaneously, but their response to lesser overload conditions is appropriately delayed. See for example U.S. Pat. Nos. 3,558,978 and 3,612,950. None of the pertinent prior art of which I am now aware is adequate to detect the symptoms of all possible faults in the controls of a separately excited d-c motor.

SUMMARY OF THE INVENTION

Accordingly, it is a general objective of the present invention to provide an improved protective circuit for a separately excited d-c motor.

Another objective is to provide a motor protective circuit that will detect any abnormal relationship between field current and armature current due to a malfunction or fault in the motor control system.

In carrying out the invention in one form, a protective circuit is supplied with a first feedback signal representative of the current in the separately excited field windings of a d-c motor, and it is also supplied with a second feedback signal representative of the current in the armature windings of the motor. The protective circuit includes first means responsive to the first and second feedback signals for producing a first fault signal whenever the magnitude of field current rises above a first reference level which varies as a predetermined function of the armature current, and second means responsive to the same two feedback signals for producing a second fault signal whenever armature current is higher than a predetermined constant magnitude and the field current falls below a second reference level which varies as another predetermined function of armature current. The first reference level is proportional to the sum of the armature current magnitude and another predetermined constant magnitude whenever armature current is higher than a predetermined minimum, and it otherwise equals a predetermined minimum excitation level. The aforesaid second reference level is proportional to the difference between the armature current magnitude and the first-mentioned predetermined constant magnitude. The value of the first fault signal is a measure of the amount by which the field current magnitude exceeds the first reference level, and the value of the second fault signal is a measure of the amount by which the field current magnitude is exceeded by the second reference level. These fault signals are supplied as alternative inputs to time delay means which responds to either signal by producing an output signal after a delay that varies inversely with the value of the active input signal. The output signal can be used to initiate appropriate corrective action (e.g., reduce or remove the electric power being supplied to the motor) to protect the motor from permanent damage.

The invention will be better understood and its various objects and advantages will be more fully appreciated from the following description taken in conjunction with the accompanying drawings.

DESCRIPTION OF THE PREFERRED EMBODIMENT

Figure 1:
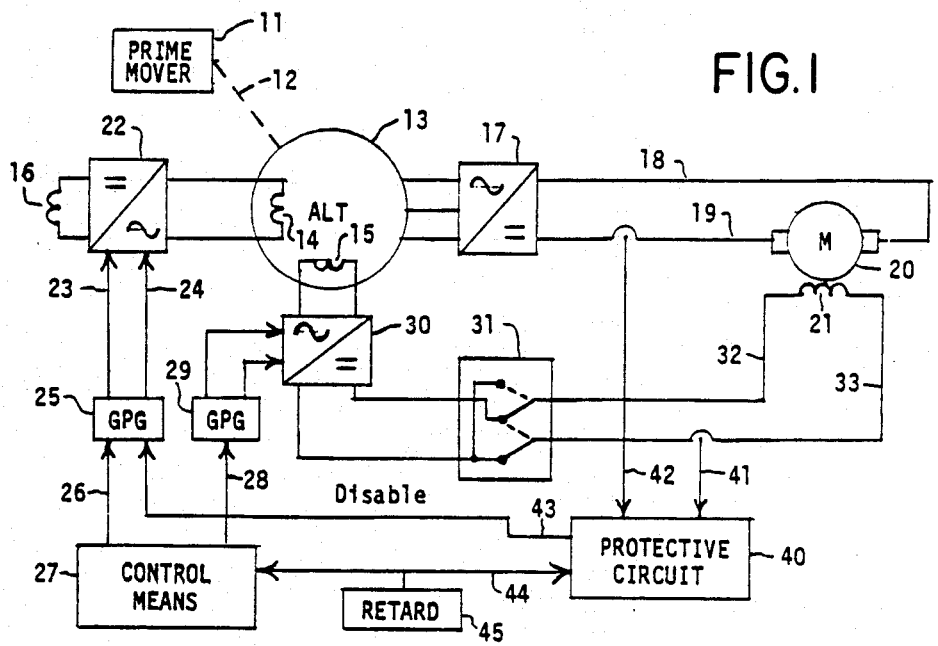
FIG. 1 is a functional block diagram of a separately excited d-c traction motor and its controls, including the protective circuit of the present invention.

The d-c motor that is shown in FIG. 1 is part of an electric propulsion system that is intended to be physically located on a self-propelled traction vehicle such as a large off-highway haulage truck. An operator-controlled throttle (e.g., a foot pedal, not shown) is adapted to control the rotational speed (revolutions per minute) of a prime mover 11 which may, for example, be a diesel engine. The output shaft 12 of the prime mover is drivingly coupled to the rotor of an alternating current (a-c) generator 13 (herein referred to as an alternator) which has a set of 3-phase main windings (not shown), a pair of auxiliary (tertiary) windings 14 and 15, and a field winding 16. The 3-phase generally sinusoidal alternating voltage that is generated in the main windings of the alternator 13 is converted to direct voltage by means of an uncontrolled full-wave rectifying bridge 17 whose output in turn is connected, via lines 18 and 19, to the armature of at least one d-c traction motor 20. The motor 20 has separately excited shunt field windings 21. The rotor of this motor is coupled through suitable speed-reduction gearing to a wheel (not shown) of the vehicle. By suitably controlling the speed of the prime mover and the excitation of the alternator and motor fields, the vehicle can be propelled (also known as "motoring") or dynamically retarded (also known as "electric braking") by its motor(s) in either a forward or a reverse direction.

During the motoring mode of operation, the motor 20 will rotate at a speed that depends on the magnitude of the voltage applied to its armature windings, which magnitude is a function of both the speed at which the alternator 13 is driven and the magnitude of excitation current in the alternator field 16. The latter current is supplied by the auxiliary winding 14 of the alternator 13 via a single-phase, full-wave "phase controlled" rectifying bridge 22. Its magnitude depends on the timing of periodic firing signals that are supplied to the rectifier 22 over lines 23 and 24 from a conventional gate pulse generator 25 which is connected to an output line 26 of associated control means 27. The control means 27 is effective to supply on line 26 a variable signal that controls the operation of the gate pulse generator 25 and thereby determines the magnitude of current in the field 16. In this manner the alternator field excitation is regulated as desired.

The control means 27 also supplies an independently variable control signal on a second output line 28 to a conventional gate pulse generator 29 which generates periodic firing signals for another single-phase, full-wave phase controlled rectifying bridge 30 connected between the second auxiliary winding 15 of the alternator 13 and the shunt field 21 of the motor 20. The direct voltage output of the rectifier 30 is connected to the motor fields 21 via a polarity reversing switch 31 and two lines 32 and 33. Thus the magnitude of excitation current in the motor field 21 is regulated or varied as desired by the control means 27, and its direction depends on the position of the reversing switch 31. With the switch in its solid-line position, current flows from left to right through the field 21 as viewed in FIG. 1, and the motor rotates in a clockwise direction. On the other hand, with the switch 31 in its broken-line position, current flows from right to left through the field 21 and the motor rotates in the opposite or counter-clockwise direction.

Figure 2:
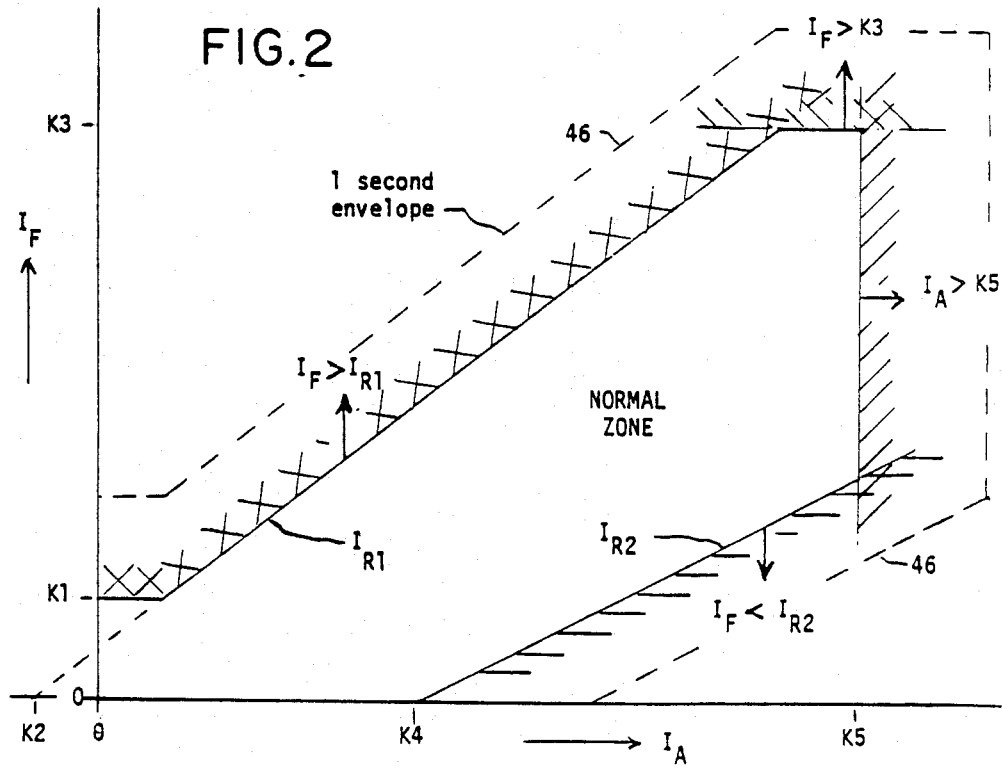
FIG. 2 is a graph of motor field current versus motor armature current to show the protective characteristics of the invention.

In the motoring mode, it is usually desirable to increase the speed of the motor 20 by weakening its field as the current in its armature (and hence motor torque) decreases. In order to achieve this result, the control means 27 is suitably constructed and arranged so that the motor field current, above a predetermined minimum level of excitation, tracks the motor armature current according to a predetermined normal relationship between these two electric quantities. A typical normal relationship is shown in FIG. 2 of U.S. Pat. No. 4,103,211—Gardner et al.

If the control means 27 were to experience a fault or failure, the motor field current could either rise to an excessively high magnitude or fall to an abnormally low magnitude, depending on the nature of the malfunction. In either case, the motor 20 could be severely damaged if the fault condition were sustained too long. In accordance with the present invention, a protective circuit 40 is provided to detect and to respond to such a malfunction.

As is indicated in FIG. 1, the protective circuit 40 is coupled by a line 41 to a current transducer in line 33, whereby it is supplied with a first feedback signal representative of the current in the motor field windings 21. The circuit 40 is also coupled by a line 42 to a current transducer in line 19, whereby it is supplied with a second feedback signal representative of the current in the armature windings of the motor 20. According to the present invention, these two feedback signals are compared in the protective circuit 40 which responds to any abnormal magnitude relationship therebetween (or to an excessively high magnitude of either one of the two feedback signals) by producing on an output line 43 a signal that disables the gate pulse generator 25, thereby inhibiting the firing signals for the rectifier 22 and consequently reducing to zero the field excitation of the alternator 13. Without excitation, the output voltage of the alternator decays to zero. As a result, propulsion power is quickly removed from the motor 20, and severe motor damage is avoided. In the dynamic retard mode, the protective circuit receives a signal on a line 44 from a retard command block 45 that nullifies its operation, thereby preventing the circuit 40 from producing any disabling signal on line 43.

A sample of the protective characteristic of the circuit 40 is shown in FIG. 2 where $I_A$ stands for the average magnitude of current in the armature windings of the motor 20 and $I_F$ stands for the average absolute magnitude of current in the field windings 21. The "absolute" magnitude of field current is the number of amperes flowing in the field without a plus or minus sign to indicate the direction of such current. In other words, $I_F$ is positive regardless of whether the feedback signal on line 41 has a positive or relatively negative polarity. As will soon be apparent, the ordinate in FIG. 2 is scaled differently than the abscissa.

So long as the actual magnitudes of field and armature currents are such that the point of their intersection in FIG. 2 falls inside the "normal zone," the relationship between these currents is in a normal range, and the protective circuit 40 will not produce a disabling signal on its output line 43. On the other hand, the circuit does produce an output signal in response to the intersecting point falling outside the limits of the normal zone. The normal zone is defined by first and second reference levels $I_{R1}$ and $I_{R2}$ and by maximum limits K3 and K5 respectively. A malfunction is indicated if and when $I_F$ rises above either $I_{R1}$ or K3 or falls below $I_{R2}$, or if and when $I_A$ exceeds K5. To avoid false response to current transients or surges of short duration, the circuit 40 includes means for delaying the production of the disabling signal on output line 43. As will soon be explained with the description of FIG. 3, this delay varies inversely with the severity of the fault. The dotted line 46 in FIG. 2 indicates the amount of current surge needed to produce an output signal with a time delay of approximately one second.

In accordance with the present invention, the protective circuit 40 is so constructed and arranged that both $I_{R1}$ and $I_{R2}$ are dependent on $I_A$. In other words, each of these two reference levels varies as a function of the magnitude of current in the motor armature windings. The first reference level $I_{R1}$ in FIG. 2 is proportional to the sum of $I_A$ and a predetermined constant magnitude (K2) whenever $I_A$ is higher than a predetermined minimum but is equal to a predetermined constant level (K1) when $I_A$ is lower than the minimum. The second level $I_{R2}$ is zero if $I_A$ is less than a predetermined constant magnitude (K4) and is otherwise proportional to the difference between $I_A$ and K4. By way of example, typical parameters are listed below for one practical embodiment of the invention:

K1 = 160 amps
K2 = 280 amps
K3 = 900 amps
K4 = 1,250 amps
K5 = 3,000 amps

In this particular example, the proportionality constant for $I_{R1}$ (i.e., the "high" slope in FIG. 2) is approximately 0.3, while the proportionality constant for $I_{R2}$ (i.e., the "low" slope in FIG. 2) is approximately 0.2.

Figure 3:
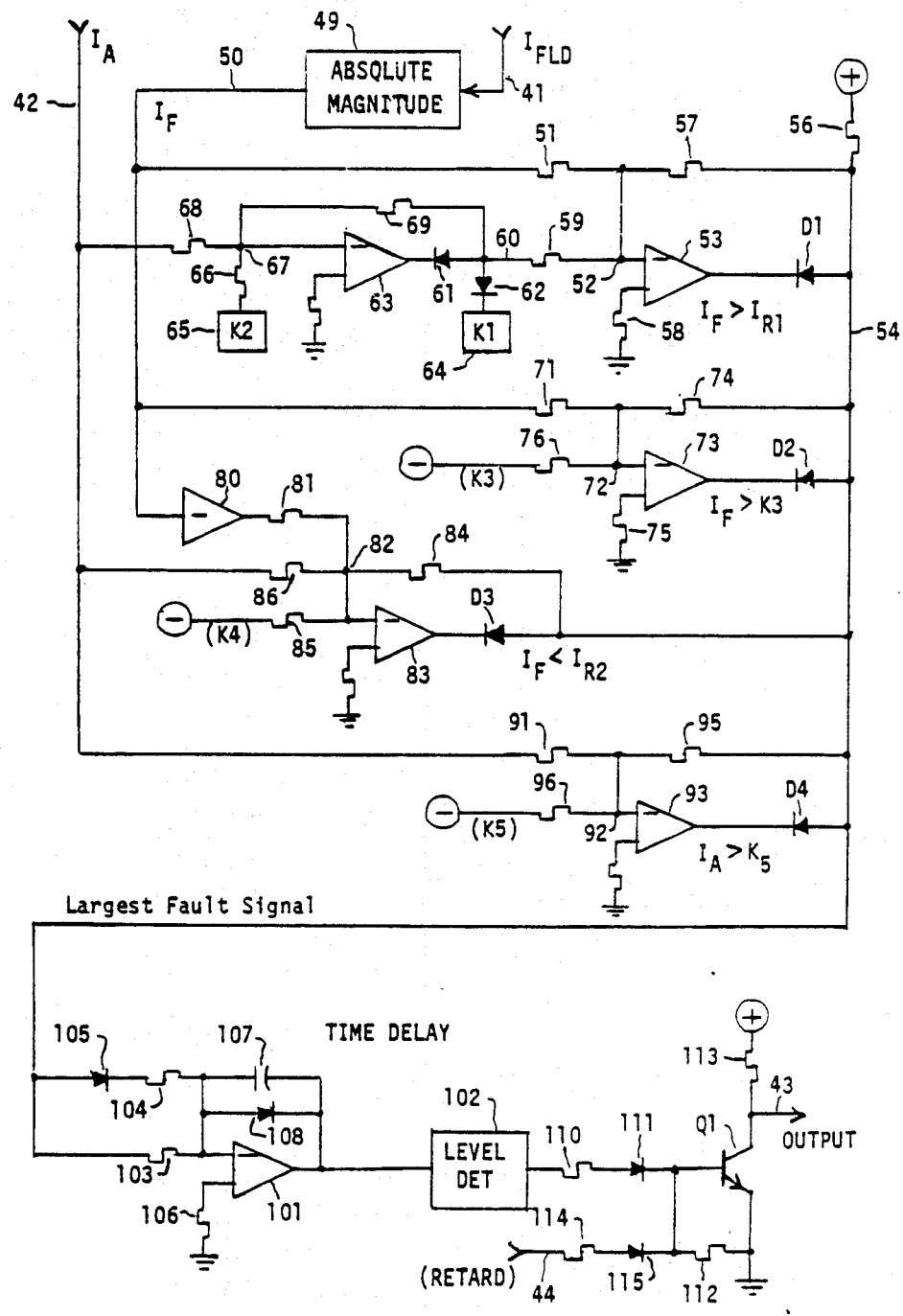
FIG. 3 is a schematic circuit diagram of a preferred embodiment of the protective circuit.

FIG. 3 shows a preferred embodiment of the protective circuit 40 and will now be described. In this embodiment the first feedback signal on line 41 is fed to suitable means 49 for converting it to an input voltage signal, on line 50, representative of the absolute magnitude ($I_F$) of the motor field current. More particularly, the electric potential on line 50, measured with respect to a predetermined reference potential (which is shown as ground), has a magnitude proportional to $I_F$ and a positive polarity regardless of whether the polarity of the feedback signal on line 41 is positive or negative with respect to ground. Line 50 is connected via a resistor 51 and a summing junction 52 to the inverting input of a conventional operational amplifier 53 (sometimes referred to as an "op amp"). The output of the amplifier 53 is connected to a bus 54 through a diode D1 which is polled to conduct current if the output voltage of this amplifier is negative with respect to the potential on the bus 54. A resistor 56 connects the bus 54 to a relatively positive control power terminal (shown in FIG. 3 as an encircled plus symbol) which has a fixed positive potential (e.g., +15 volts) with respect to the reference potential (ground). A resistor 57 is connected in a feedback path from the bus 54 to the inverting input of the op amp 53, and a resistor 58 is connected between ground and the non-inverting input of this amplifier. The summing junction 52 is connected via an input resistor 59 to a line 60 on which there is a relatively negative voltage of variable magnitude proportional to the aforesaid first reference level $I_{R1}$.

As will be readily understood by persons skilled in the art, the op amp 53 produces an output voltage equal to $-(V1-V2)$, where V1 is proportional to the first input voltage on line 50 and V2 is proportional to the second input voltage on line 60. In each case, the proportionality constant (i.e., the gain) equals the ratio of the ohmic value of the feedback resistor 57 to the ohmic value of the corresponding input resistor 51 or 59. Preferably the resistor 59 has the same resistance as the resistor 51 so that both input voltages are equally amplified. As will soon be explained, the output voltage of the op amp 53 has to be negative with respect to ground in order to activate "downstream" time delay means of the protective circuit, and such a negative voltage is herein referred to as a "fault signal." It is therefore apparent that the first op amp 53 produces a fault signal whenever the magnitude of the input voltage on line 50 exceeds the magnitude of the input voltage on line 60, and the value of this signal (i.e., the magnitude of the amplifier's negative output voltage) is a measure of the amount of the excess.

Line 60 is connected, through diodes 61 and 62 that serve an "or" logic purpose, to the outputs of a second op amp 63 and a bias source 64, respectively. The source 64 applies to the cathode of the diode 62 a bias voltage that is negative with respect to ground and that has a fixed magnitude proportional to the aforesaid constant level K1. So long as the output voltage of the op amp 63 is smaller (i.e., less negative) than this bias voltage, the diode 62 is conducting current, the voltage on the line 60 is equal to the constant bias voltage, and the diode 61 is reverse biased. But whenever the magnitude of the variable output voltage of the amplifier 63 is greater than the bias voltage, the diode 61 is conducting, the voltage on line 60 equals this output voltage, and the diode 62 is reverse biased.

The output voltage of the op amp 63 has a relatively negative polarity, and its magnitude is the sum of two amplified input voltages. One of the input voltages is a constant, relatively positive voltage obtained from another bias source 65 which is connected via a resistor 66 and a summing junction 67 to the inverting input of the amplifier 63. This bias voltage is proportional to the magnitude of motor armature current shown at K2 in FIG. 2. The other input voltage is the relatively positive voltage on the armature current feedback line 42 which is connected via an input resistor 68 to the summing junction 67. The magnitude of the latter voltage varies with $I_A$. A feedback resistor 69 is connected between the junction 67 and the line 60. With this arrangement, the output voltage of the second op amp 63 is proportional to $I_A+K2$. The ratio of the resistance of the feedback resistor 69 to the resistance of the input resistor 68 determines the slope of the first reference level $I_{R1}$ when $I_A$ is higher than the aforesaid predetermined minimum. This minimum is the magnitude of $I_A$ at which the output voltage of the op amp 63 has a magnitude just equal to the magnitude of the constant bias voltage supplied by source 64.

In order to produce another fault signal whenever $I_F$ exceeds the aforesaid maximum limit K3 (see FIG. 2), line 50 of the protective circuit shown in FIG. 3 is connected via a resistor 71 and a summing junction 72 to the inverting input of an op amp 73. A diode D2 connects the output of the amplifier 73 to the bus 54, and it is polled to conduct current when the voltage at the output of 73 (i.e., the second fault signal) is negative with respect to the potential on bus 54. A resistor 74 is connected in a feedback path from the bus 54 to the inverting input of the op amp 73, and a resistor 75 is connected between ground and the non-inverting input of this amplifier. The summing junction 72 is connected via an input resistor 76 to a relatively negative control power terminal (shown in FIG. 3 as an encircled minus symbol) which has a fixed negative potential (e.g., −15 volts) with respect to the reference potential (ground). It will now be apparent that the op amp 73 produces a fault signal whenever the amplified magnitude of the input voltage on line 50 exceeds a limit determined by the ratio of the resistance of the feedback resistor 74 to the resistance of the second input resistor 76, and the value of this signal is a measure of the amount of the excess. In other words, the magnitude of the negative output voltage of op amp 73 is proportional to $I_F-K3$. If it is larger than the magnitude of the output voltage of the first op amp 53, diode D1 will be reverse biased.

As is indicated in FIG. 3, line 50 is also connected to the input of a polarity inverting amplifier 80 of unity gain, and the output of the amplifier 80 is in turn connected, via an input resistor 81 and a summing junction 82, to the inverting input of another op amp 83. A diode D3 connects the output of the amplifier 83 to the bus 54, and it is polled to conduct current when the output voltage of 83 is negative with respect to the potential on bus 54. A feedback resistor 84 is connected between the summing junction 82 and the bus 54. Two additional input voltages are associated with the op amp 83. One of them is a constant, relatively negative bias voltage obtained from a negative control power terminal which is connected via a second input resistor 85 to the summing junction 82. The second one of the two additional input voltages is the relatively positive voltage on the armature current feedback line 42 which is connected via a third input resistor 86 to the summing junction 82. It will now be apparent that the op amp 83 produces a fault signal whenever the amplified magnitude of the input voltage on line 50 falls below a magnitude that equals the amplified magnitude of the input voltage on line 42 less a constant magnitude determined by the ratio of the resistance of the feedback resistor 84 to the resistance of the second input resistor 85, and the value of this signal is a measure of the amount of the short fall. In other words, the output voltage of op amp 83 has a magnitude proportional to $I_{R2}-I_F$, where $I_{R2}$ is a variable magnitude proportional to the difference between $I_A$ and the aforesaid constant magnitude K4. Whenever $I_A$ is higher than K4 and $I_{R2}$ exceeds $I_F$, this output voltage is relatively negative. If its magnitude is larger than the magnitude of the output voltage of either the op amp 53 or the op amp 73, diodes D1 and D2 will be reverse biased. Note that the ratio of the resistance of the feedback resistor 84 to the resistance of the third input resistor 86 determines the slope of the second reference level $I_{R2}$ when $I_4$ is higher than K4.

In order to produce yet another fault signal whenever $I_4$ exceeds the aforesaid maximum limit K5 (see FIG. 2), line 42 of the protective circuit shown in FIG. 3 is connected via a resistor 91 and a summing junction 92 to the inverting input of an op amp 93. A diode D4 connects the output of the amplifier 93 to the bus 54, and it is polled to conduct current when the voltage at the output of 93 (i.e., the fourth fault signal) is negative with respect to the potential on bus 54. A feedback resistor 95 is connected between the summing junction 92 and the bus 54. The summing junction 92 is connected via an input resistor 96 to a relatively negative control power terminal. Consequently, the op amp 93 produces a fault signal whenever the amplified magnitude of the input voltage on line 42 exceeds a limit determined by the ratio of the resistance of the feedback resistor 95 to the resistance of the second input resistor 96, and the value of the signal is a measure of the amount of the excess. In other words, the magnitude of the negative output voltage of op amp 93 is proportional to $I_4-K5$.

The diodes D1, D2, D3, and D4 serve an "or" logic purpose. Only one of them conducts at a time. If and when two or more of the op amps 53, 73, 83, and 93 are producing concurrent fault signals, the conducting diode is the one associated with whichever one of the four fault signals has the largest value (i.e., whichever one is least positive). The magnitude of the negative voltage on the bus 54 is then substantially the same as the magnitude of the largest fault signal, and each of the three other diodes will be reverse biased. The largest fault signal activates downstream time delay means to which the bus 54 is connected.

In the embodiment of the invention that is illustrated in FIG. 3, the time delay means comprises, in combination, an op amp 101 connected in an integrating mode, a level detector 102, and a normally turned on NPN transistor Q1. The inverting input of the op amp 101 is connected to the bus 54 via a pair of parallel resistors 103 and 104. A diode 105 is connected in series with the latter resistor 104, and it is polled to conduct current when the potential on the bus 54 is positive with respect to the potential at the inverting input of the op amp 101. A resistor 106 connects the non-inverting input of this op amp to ground. The feedback path includes a normally discharged capacitor 107 which is shunted by a diode 108. The diode 108 is polled to conduct current when the voltage at the output of the op amp is negative with respect to the inverting input, whereby the output voltage is clamped at zero so long as there is positive potential on bus 54.

The output of the op amp 101 is connected to the level detector 102 which is suitably constructed and arranged to provide at its output a relatively high voltage of relatively positive polarity whenever its input voltage is below a predetermined positive "pickup" level (e.g., +10 volts). The output of the level detector 102 is connected through a resistor 110 and an isolating diode 111 to the base of the normally turned on transistor Q1. The emitter of Q1 is connected directly to ground, and a resistor 112 is connected between base and emitter. The collector of Q1 is connected via a collector resistor 113 to a positive control power terminal, and it is also connected to the output line 43 of the protective circuit. The positive output voltage of the level detector 102 will forward bias the transistor Q1, and in this normal state Q1 maintains the output line 43 at nearly ground potential. Alternatively, during the dynamic retard mode of operation, Q1 will be forward biased by a positive signal received from the retard command block 45 (FIG. 1) on line 44 which is connected to the base of Q1 via a resistor 114 and an isolating diode 115.

As soon as one (or more) of the operational amplifiers 53, 73, 83, and 93 starts producing a fault signal, the potential on the bus 54 abruptly changes from a quiescent level (which is positive with respect to ground) to a negative level having substantially the same magnitude as the largest fault signal. This activates the integrating op amp 101 and causes its output voltage to begin increasing or "ramping up" in a positive-going sense from an initially low level which is near ground potential. The rate of increase is determined by the time constant of the integrator (i.e., the product of the resistance of resistor 103 and the capacitance of capacitor 107) and by the magnitude of the negative voltage on the line 54. The larger the voltage on line 54, the higher the rate of change. Subsequently, after a delay that varies inversely with the magnitude of the voltage on line 54, the output voltage of the op amp 101 attains the aforesaid pickup level, and the level detector 102 now switches its output to zero. This removes the forward bias from the transistor Q1 which promptly turns off (assuming no positive voltage on line 44). With the transistor Q1 turned off, the output line 43 is no longer clamped to ground, and a disabling output signal of positive potential is produced on this line.

Whenever all fault signals terminate (which may take place either before or after the output signal is produced on line 43), the voltage on the bus 54 returns to its quiescent level, whereupon the now charged capacitor 107 begins to discharge and the output voltage of the op amp 101 correspondingly decreases or ramps down to zero. The decrease is relatively fast because the time constant of the capacitor discharge path (which includes both resistors 103 and 104 in parallel) is significantly shorter than the first-mentioned time constant. Thus the time delay means is quickly reset.

While a preferred embodiment of the invention has been shown and described by way of example, many modifications will undoubtedly occur to persons skilled in the art. The concluding claims are therefore intended to cover all such modifications as fall within the true spirit and scope of the invention.

I claim:

1. In a protective circuit for a direct current electric motor having armature windings and separately excited field windings, the improvement comprising:
   a. first means for providing a first feedback signal representative of the current in said field windings;
   b. second means for providing a second feedback signal representative of the current in said armature windings; and
   c. third means coupled to said first and second means for producing a first fault signal only when said field current is excessively high, as indicated by the absolute magnitude ($I_F$) of field current being above a first reference level ($I_{R1}$) which varies as a predetermined function of the armature current magnitude ($I_A$).

2. The improvement as in claim 1, in which $I_{R1}$ is proportional to the sum of $I_A$ and a predetermined constant magnitude whenever $I_A$ is higher than a predetermined minimum, and in which $I_{R1}$ equals a predetermined constant level when $I_A$ is lower than said minimum.

3. The improvement as in claim 1, in which the value of said first fault signal is a measure of the amount by which $I_F$ exceeds $I_{R1}$, and further comprising time delay means activated by said first fault signal for producing an output signal after a delay that varies inversely with the value of its activating signal.

4. The improvement as in claim 3 and further comprising fourth means coupled to said first means for producing a second fault signal whenever $I_F$ exceeds a predetermined high limit, the value of said second fault signal being a measure of the amount by which $I_F$ exceeds said limit, and in which said time delay means is arranged to be activated by whichever one of said first and second fault signals has the larger value.

5. The improvement as in claim 1 and further comprising fourth means coupled to said first and second means for producing a second fault signal whenever $I_A$ is higher than a predetermined constant magnitude and $I_F$ falls below a second reference level ($I_{R2}$) which varies as another predetermined function of $I_A$.

6. The improvement as in claim 5, in which $I_{R2}$ is proportional to the difference between $I_A$ and said predetermined constant magnitude.

7. The improvement as in claim 6, in which $I_{R1}$ is proportional to the sum of $I_A$ and another predetermined constant magnitude, which is less than said first-mentioned predetermined constant magnitude, whenever $I_A$ is higher than a predetermined minimum, and in which $I_{R1}$ equals a predetermined constant level when $I_A$ is lower than said minimum.

8. The improvement as in claim 5, in which the value of said first fault signal is a measure of the amount by which $I_F$ exceeds $I_{R1}$, in which the value of said second fault signal is a measure of the amount by which $I_{R2}$ exceeds $I_F$, and further comprising time delay means activated by whichever one of said first and second fault signals has the larger value for producing an output signal after a delay that varies inversely with the value of its activating signal.

9. The improvement as in claim 8, and further comprising fifth means coupled to said second means for producing a third fault signal whenever $I_A$ exceeds a predetermined high limit, the value of said third fault signal being a measure of the amount by which $I_A$ exceeds said limit, and in which said time delay means is arranged to be activated by whichever one of said first, second and third fault signals has the largest value.

10. The improvement as in claim 9, and further comprising sixth means coupled to said first means for producing a fourth fault signal whenever $I_F$ exceeds another predetermined high limit, the value of said fourth fault signal being a measure of the amount by which $I_F$ exceeds said last-mentioned limit, and in which said time delay means is arranged to be activated by whichever one of said first, second, third and fourth fault signals has the largest value.

11. In a protective circuit for a direct current electric motor having armature windings and separately excited field windings, the improvement comprising:
a. first means for providing a first feedback signal represented of the current in said field windings;
b. second means for providing a second feedback signal representative of the current in said armature windings; and
c. third means coupled to said first and second means for producing a fault signal only when said field current is abnormally low, as indicated by the armature current magnitude ($I_A$) being higher than a predetermined constant magnitude and the absolute magnitude ($I_F$) of field current being lower than a reference level ($I_R$) which varies as a predetermined function of $I_A$.

12. The improvement as in claim 11, in which $I_R$ is proportional to the difference between $I_A$ and said predetermined constant magnitude.

13. The improvement as in claim 11, in which the value of said fault signal is a measure of the amount by which $I_R$ exceeds $I_F$, and further comprising time delay means activated by said fault signal for producing an output signal after a delay that varies inversely with the value of its activating signal.

14. The improvement as in claim 13, and further comprising fourth means coupled to said second means for producing another fault signal whenever $I_A$ exceeds a predetermined high limit, the value of said other fault signal being a measure of the amount by which $I_A$ exceeds said limit, and in which said time delay means is arranged to be activated by whichever one of said fault signals has the larger value.

* * * * *